US009371046B2

(12) United States Patent
Utsunomiya et al.

(10) Patent No.: US 9,371,046 B2
(45) Date of Patent: Jun. 21, 2016

(54) ROTARY CONNECTOR WITH A STEERING ANGLE SENSOR

(71) Applicants: Furukawa Electric Co., Ltd., Tokyo (JP); Furukawa Automotive Systems Inc., Shiga (JP)

(72) Inventors: Hirofumi Utsunomiya, Shiga (JP); Yasuharu Kakimoto, Shiga (JP)

(73) Assignees: FURUKAWA ELECTRIC CO., LTD, Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 98 days.

(21) Appl. No.: 14/292,478

(22) Filed: May 30, 2014

(65) Prior Publication Data

US 2014/0266168 A1 Sep. 18, 2014

Related U.S. Application Data

(63) Continuation of application No. PCT/JP2014/000133, filed on Jan. 15, 2014.

(30) Foreign Application Priority Data

Jan. 15, 2013 (JP) .................................. 2013-004663
Jan. 15, 2013 (JP) .................................. 2013-004668

(51) Int. Cl.
*G01B 7/30* (2006.01)
*B60R 16/027* (2006.01)
*B62D 15/02* (2006.01)
*H01R 35/02* (2006.01)

(52) U.S. Cl.
CPC .......... *B60R 16/027* (2013.01); *B62D 15/0215* (2013.01); *G01B 7/30* (2013.01); *H01R 35/025* (2013.01); *H01R 2201/26* (2013.01)

(58) Field of Classification Search
CPC .... B60R 16/027; B62D 15/0215; G01B 7/30; H01R 35/04; H01R 35/025
USPC .............................. 324/207.2, 207.21, 207.25
See application file for complete search history.

(56) References Cited

U.S. PATENT DOCUMENTS

2009/0013821 A1* 1/2009 Koma ................ B62D 15/0215
74/575
2012/0329314 A1* 12/2012 Adachi ................ B60R 16/027
439/501

(Continued)

FOREIGN PATENT DOCUMENTS

JP 2000-159037 A 6/2000
JP 2001-165607 A 6/2001

(Continued)

*Primary Examiner* — Jay Patidar
(74) *Attorney, Agent, or Firm* — Amin, Turocy & Watson, LLP

(57) ABSTRACT

A steering angle sensor (3) includes: a sensor housing (40) that is fixable to a stator (11); idler gears (47) configured to be meshed with a drive gear (30) and rotated by the drive gear (30); a rotatable member (43) configured to be engaged with a sleeve (20) and rotated integrally with the sleeve (20); a detector (34) configured to detect rotation of the rotatable member (43); and a holder (49) configured to hold the detector (34). The sensor housing (40) is opened at its stator (11) side. A second storage space (50) is formed that is enclosed by the sensor housing (40) and the stator (11). The rotatable member (43) is stored in the second storage space (50). The holder (49) is able to hold the detector (34) even in the state where the second storage space (50) is not closed by the stator (11).

8 Claims, 11 Drawing Sheets

(56) References Cited

U.S. PATENT DOCUMENTS

2013/0115785 A1 * 5/2013 Kamiya ................ B60R 16/027 439/15
2013/0344706 A1 * 12/2013 Sato ..................... B60R 16/027 439/15

FOREIGN PATENT DOCUMENTS

| JP | 2004-314901 A | 11/2004 |
| JP | 2006-339107 A | 12/2006 |

* cited by examiner (a)

(b)

PRIOR ART

ROTARY CONNECTOR WITH A STEERING ANGLE SENSOR

CROSS-REFERENCE TO RELATED APPLICATION

The subject application is a continuation of PCT Application Ser. No. PCT/JP2014/000133, filed Jan. 15, 2014, and entitled "ROTARY CONNECTOR WITH SENSOR ASSEMBLED THERETO", which claims priority to Japanese Patent Application Serial No. 2013-004663, filed Jan. 15, 2013, and Japanese Patent Application Serial No. 2013-004668, filed Jan. 15, 2013, the disclosures of which are incorporated herein by reference in their entirety.

TECHNICAL FIELD

The present invention relates to a configuration of a rotary connector with sensor assembled thereto, which is a rotary connector to which a steering angle sensor is assembled.

BACKGROUND ART

Conventionally, a rotary connector (SRC: steering roll connector) has been used for electrical connection between a rotatable side and a fixed side, for example, between a steering wheel and a vehicle body of an automobile. A steering angle sensor (SAS) that detects the angle of operation (steering angle) of the steering wheel has been known, too.

In some cases, the steering angle sensor may be, together with the rotary connector, mounted to the steering wheel. Such a configuration is shown in, for example, Patent Document 1. The Patent Document 1 discloses a configuration in which a rotary connector is coupled to a steering angle sensor.

Patent Document 2 discloses a rotary connector device having a steering angle sensor incorporated therein.

In the configuration shown in the Patent Document 1, the rotary connector and the steering angle sensor are separate from each other. Such a configuration allows the rotary connector and the steering angle sensor to be handled as independent modules. Thus, they can be handled with ease during assembling. This advantageously improves the workability in assembling.

FIGS. 10 and 11 show an example of conventional rotary connector and steering angle sensor in such a modularized fashion. A conventional rotary connector 2 shown in FIG. 10 includes a stator 11 and a rotator 12 that are rotatable relative to each other. A conventional steering angle sensor 3 shown in FIGS. 10 and 11 includes a sensor housing 40 and a rotatable member 43. The rotatable member 43 is rotatable relative to the sensor housing 40. A detector 34 (idler gears 47 and a circuit board 48) that detects the amount of rotation of the rotatable member 43 is received in the sensor housing 40.

In the structure shown in FIG. 10, the rotator 12 of the rotary connector 2 and the rotatable member 43 of the steering angle sensor 3 are coupled to each other via a sleeve 20 (linkage member). The sleeve 20 is configured to be coupled to the rotator 12 of the rotary connector 2 (the state shown in FIG. 10). The sleeve 20 has cutouts 35. The cutouts 35 are engageable with engaging projections 56 formed in the rotatable member 43 of the steering angle sensor 3 (see FIG. 10). Bringing the engaging projections 56 into engagement with the cutouts 35 makes the rotator 12 of the rotary connector 2 and the rotatable member 43 of the steering angle sensor 3 coupled to each other via the sleeve 20. This enables the detector 34 of the steering angle sensor 3 to detect the amount of rotation of the rotator 12.

As shown in FIG. 10, the stator 11 of the conventional rotary connector 2 includes a bottom plate 101. The bottom plate 101 functions as "lid" for preventing elements (such as a flexible flat cable) provided within the rotary connector 2 from falling out of it. As shown in FIG. 11, the sensor housing 40 of the conventional steering angle sensor 3 includes an upper covering 102. The upper covering 102 functions as "lid" for preventing elements (such as the detector 34) provided within the sensor housing 40 from falling out of it.

PRIOR-ART DOCUMENTS

Patent Documents

Patent Document 1: Japanese Patent Application Laid-Open No. 2006-339107
Patent Document 2: Japanese Patent Application Laid-Open No. 2000-159037

SUMMARY OF THE INVENTION

Problems to be Solved by the Invention

To assemble a rotary connector with sensor assembled thereto having the conventional configuration shown in FIG. 10, the rotary connector 2 and the steering angle sensor 3 are coupled to each other in the direction indicated by the thick arrow in FIG. 10 (at this time, the cutouts 35 are engaged with the engaging projections 56). As a result, the bottom plate 101 and the upper covering 102 are stacked with respect to the thickness direction. In other words, in the rotary connector with sensor assembled thereto having the configuration shown in FIG. 10, parts of the rotary connector 2 and the steering angle sensor 3 (the bottom plate 101 of the stator 11 and the upper covering 102 of the sensor housing 40) overlap. Thus, a room for improvement is left from the viewpoint of reduction in the number of parts.

The conventional configuration shown in FIG. 10 involves a problem that tolerances are accumulated into a large tolerance in total because parts of the rotary connector 2 and the steering angle sensor 3 overlap. Moreover, in the conventional configuration shown in FIG. 10, it is necessary that the rotary connector 2 and the steering angle sensor 3 are assembled separately and then coupled to each other. This results in increased assembling effort. These problems can be mentioned in the Patent Document 1, too.

The Patent Document 2 discloses a configuration in which an upper housing that covers a circuit board of a steering angle sensor is integrated with a lower covering member of a rotary connector to thereby achieve shared use of it. The Patent Document 2 states that this can reduce the number of parts. Such reduction in the number of parts leads to less assembling effort, and additionally eliminates an accumulation of tolerances so that the entire tolerance can be reduced.

On the other hand, the configuration disclosed in the Patent Document 2 fails to provide the advantage of the configuration shown in FIG. 10 (and the Patent Document 1) that the rotary connector and the steering angle sensor can be handled as independent modules. In the configuration of the Patent Document 2, for example, the rotary connector has no lower covering member (a storage room for storing a flexible flat cable is opened at its lower side) before the steering angle sensor is assembled to the rotary connector. This may cause the flexible flat cable to fall out from the storage room. Therefore, the configuration of the Patent Document 2 does not allow the rotary connector, before the steering angle sensor is assembled thereto, to be handled as an independent module.

The configuration of the Patent Document 2, which does not allow the rotary connector and the steering angle sensor to be handled as independent modules, involves a problem of degraded workability in assembling.

In addition, the conventional configuration shown in FIG. 10 needs to ensure a large tolerance in a portion where the cutouts 35 and the engaging projections 56 are engaged with each other, in order that the cutouts 35 and the engaging projections 56 are engageable. This is also a factor of increasing the entire tolerance in the conventional configuration shown in FIG. 10. This is why the improving the accuracy of detection of the steering angle sensor 3 is difficult in the configuration shown in FIG. 10.

The present invention has been made in view of the circumstances described above, and an object of the present invention is to provide a rotary connector that achieves good assembling properties with reduction in the number of parts, and the like.

Means for Solving the Problems and Effects Thereof

Problems to be solved by the present invention are as described above, and next, means for solving the problems and effects thereof will be described.

In an aspect of the present invention, a rotary connector with sensor assembled thereto having the following configuration is provided. The rotary connector with sensor assembled thereto includes a rotary connector, a sleeve, and a steering angle sensor. The rotary connector includes a stator and a rotator that are rotatable relative to each other, and a flat cable arranged in a first storage space that is enclosed by the stator and the rotator. The sleeve is configured to be coupled to the rotator and rotated integrally with the rotator. The steering angle sensor includes: a sensor housing that is fixable to the stator; a rotatable member configured to be engaged with the sleeve and rotated integrally with the sleeve; a detector configured to detect rotation of the rotatable member; and a holder configured to hold the detector. The sensor housing is opened at the stator side thereof. A second storage space is formed that is enclosed by the sensor housing and the stator. The rotatable member is stored in the second storage space. The holder is able to hold the detector even in a state where the second storage space is opened.

The stator of the rotary connector serves also to close the housing of the steering angle sensor. This leads to reduction in the number of parts, less assembling effort, and a reduced tolerance. Providing the holder that is able to hold the detector even in the state where the housing of the steering angle sensor is not closed by the stator enables the steering angle sensor in such a state to be handled as an independent module. This makes assembling easy.

Preferably, the rotary connector with sensor assembled thereto is configured as follows. The rotary connector with sensor assembled thereto includes a retainer for guiding the flat cable, the retainer being provided in the first storage space. A retainer guide face for guiding rotation of the retainer is provided on a surface of the stator facing the rotator side, and a rotation guide for guiding rotation of the rotatable member is provided on a surface of the stator facing the sensor housing side.

Accordingly, the stator is able to serve both for guiding the retainer and for guiding the rotatable member of the sensor. This can reduce the number of parts, and also provides stabilized rotation of the retainer and the rotatable member.

Preferably, the rotary connector with sensor assembled thereto is configured as follows. Gear teeth of a drive gear are formed so as to protrude in a direction parallel to a mounting axis of the rotary connector and the steering angle sensor. The idler gear is supported on the holder such that an axis around which the idler gear rotates is substantially perpendicular to the mounting axis.

Such arrangement in which the gear teeth of the drive gear are opposed to gear teeth of the idler gear with respect to the direction parallel to the mounting axis is able to cause the drive gear and the idler gear to be meshed with each other by bringing these gears close to each other in the direction of the mounting axis. This improves the workability in assembling.

Preferably, the rotary connector with sensor assembled thereto is configured as follows. The stator and the sensor housing include a plurality of positioning parts for settling the position of the sensor housing relative to the stator. The positioning part includes: a positioning pin provided to either one of the stator and the sensor housing, the positioning pin protruding in a direction parallel to a mounting axis of the rotary connector and the steering angle sensor; and an insertion hole provided in the other of the stator and the sensor housing, the insertion hole being configured to receive the positioning pin inserted therethrough.

Since the position of the housing of the steering angle sensor is directly settled relative to the stator of the rotary connector, the steering angle sensor can be assembled to the rotary connector with improved accuracy. Since the positioning part includes the positioning pin that protrudes in the direction parallel to the mounting axis, the position settlement is achieved easily by assembling of the steering angle sensor to the stator in the mounting axis direction.

In another aspect of the present invention, a rotary connector with sensor assembled thereto having the following configuration is provided. The rotary connector with sensor assembled thereto includes a rotary connector, a sleeve, and a steering angle sensor. The rotary connector includes a stator and a rotator that are rotatable relative to each other, and a flat cable arranged in a first storage space that is enclosed by the stator and the rotator. The sleeve includes a cylindrical part configured to be coupled to the rotator and rotated integrally with the rotator, the cylindrical part being formed integrally with a drive gear that is provided at the periphery of the cylindrical part. The steering angle sensor includes: a sensor housing that is fixable to the stator; an idler gear configured to be meshed with the drive gear and rotated by the drive gear; a circuit board on which a detection element for detecting rotation of the idler gear is mounted; and a holder configured to hold the idler gear and the circuit board. The sensor housing is opened at the stator side thereof. A second storage space is formed that is enclosed by the sensor housing and the stator, and the drive gear is stored in the second storage space. The holder is able to hold the idler gear and the circuit board even in a state where the second storage space is opened.

Forming the sleeve integrally with the drive gear leads to further reduction in the number of parts. Additionally, since the drive gear is integrated with the sleeve, the drive gear can be kept held on the steering angle sensor side by the sleeve being coupled to the rotator. Moreover, since the drive gear is integrated with the sleeve, a smaller tolerance is required as compared with a case where they are configured as separate members. As a result, the accuracy of detection of the steering angle sensor can be improved.

Preferably, the rotary connector with sensor assembled thereto is configured as follows. The rotary connector with sensor assembled thereto includes a retainer for guiding the flat cable, the retainer being provided in the first storage space. A retainer guide face for guiding rotation of the retainer is provided on a surface of the stator facing the rotator side, and a rotation guide for guiding rotation of the drive gear is provided on a surface of the stator facing the sensor housing side.

Accordingly, the stator serves both for guiding the retainer and for guiding the drive gear. This can reduce the number of parts, and also provides stabilized rotation of the retainer and the drive gear.

EMBODIMENT FOR CARRYING OUT THE INVENTION

Figure 1:
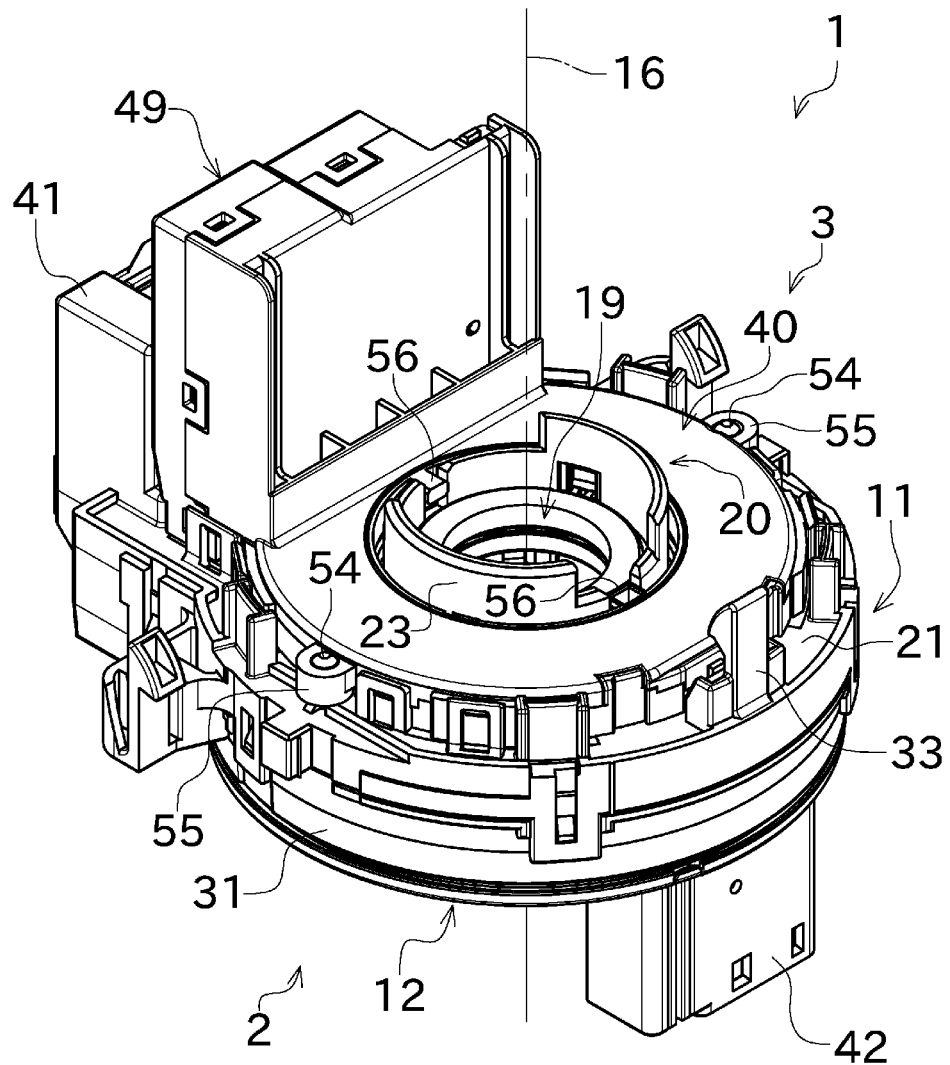
FIG. 1 A perspective view showing an entire configuration of a rotary connector with sensor assembled thereto according to a first embodiment.

Next, a first embodiment of the invention of the prevent application will be described. FIG. 1 shows a perspective view of a rotary connector 1 with sensor assembled thereto according to a first embodiment of the present invention.

The rotary connector 1 with sensor assembled thereto is an integrated assembly of a rotary connector 2 and a steering angle sensor 3. The rotary connector 2 electrically connects a vehicle body (not shown) and a steering wheel (not shown) of an automobile to each other. The steering angle sensor 3 detects the angle of operation (steering angle) of the steering wheel.

The rotary connector 1 with sensor assembled thereto has, in its center, an insertion hole 19 that is a through hole. The rotary connector 1 with sensor assembled thereto is mounted to the vehicle body and the steering wheel, under the state where a steering shaft whose axis is set coincident with the insertion hole 19 is received through the insertion hole 19. Therefore, the axis of the insertion hole 19 will be called a mounting axis 16 of the rotary connector 2 and the steering angle sensor 3.

Firstly, the rotary connector 2 will be described. The rotary connector 2 includes a cable housing 13 composed of a stator 11 and a rotator 12 that are rotatable relative to each other around the mounting axis 16.

The stator 11 is fixed to the vehicle body (for example, a steering column) of the automobile. The rotator 12 is rotatable integrally with the steering wheel. The stator 11 and the rotator 12 rotate relative to each other in accordance with a rotational operation of the steering wheel.

Figure 2:
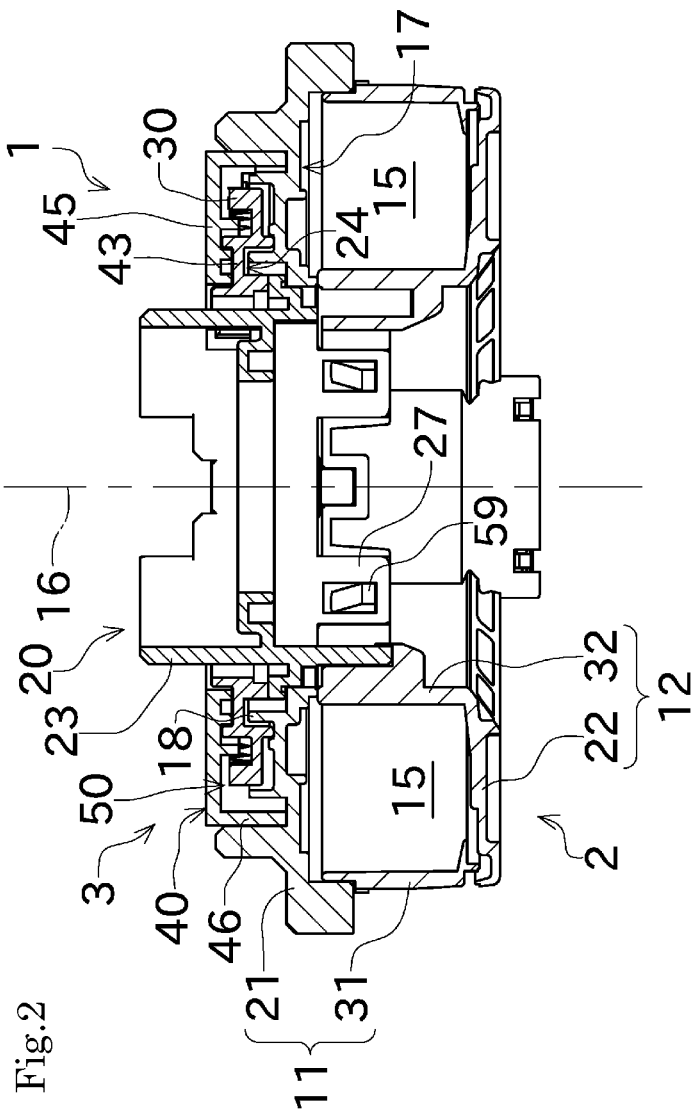
FIG. 2 A cross-sectional view of the rotary connector with sensor assembled thereto according to the first embodiment.
Figure 3:
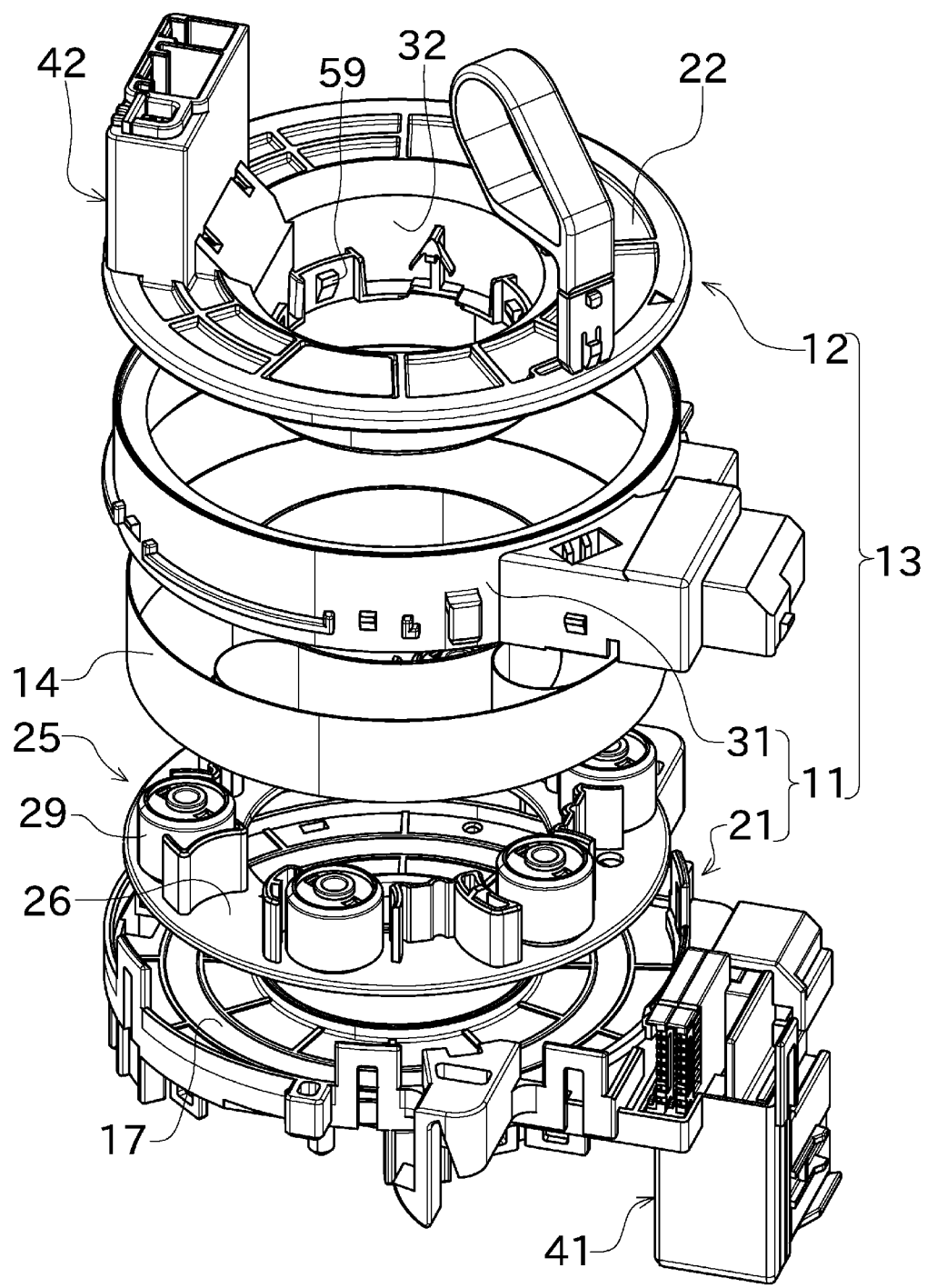
FIG. 3 An exploded perspective view of the rotary connector.

As shown in FIGS. 2 and 3, the stator 11 includes a fixed-side ring plate 21 and an outer tube 31 having a cylindrical shape. The outer tube 31 is fixed to an outer edge portion of the fixed-side ring plate 21. The rotator 12 includes a rotatable-side ring plate 22 having a ring-like shape and an inner tube 32 having a cylindrical shape. The inner tube 32 extends perpendicularly from an inner edge of the rotatable-side ring plate 22.

The fixed-side ring plate 21 and the rotatable-side ring plate 22 are arranged so as to extend in a direction perpendicular to the mounting axis 16. The fixed-side ring plate 21 and the rotatable-side ring plate 22 are arranged opposed to each other with respect to the direction of the mounting axis 16. The inner tube 32 and the outer tube 31 having the cylindrical shapes are arranged with their axes set coincident with the mounting axis 16. The inner tube 32 is arranged inside the outer tube 31. The outer tube 31 and the inner tube 32 are arranged opposed to each other with respect to the radial direction. Such a configuration defines a first storage space 15 having an annular shape enclosed by the fixed-side ring plate 21, the rotatable-side ring plate 22, the outer tube 31, and the inner tube 32 (FIG. 2).

A flexible flat cable 14 and a retainer 25 (see FIG. 3) are arranged in the first storage space 15 (in FIG. 2, the flexible flat cable and the retainer 25 are not shown).

The flexible flat cable 14 that is wound helically (spirally) is stored in the first storage space 15.

The retainer 25 is provided for the purpose of guiding the flexible flat cable 14 in the first storage space 15. As shown in FIG. 3, the retainer 25 includes a support plate 26 and a plurality of guide rollers 29. The guide rollers 29 are members for guiding the flexible flat cable 14 by rotating in contact with the flexible flat cable 14 stored in the first storage space 15. The support plate 26 supports the plurality of guide rollers 29 in a rotatable manner. The support plate 26 having an annular shape (ring-like shape) is arranged in the first storage space 15 such that the support plate 26 extends in parallel with the fixed-side ring plate 21 and the rotatable-side ring plate 22. Each of the guide rollers 29 is arranged on a surface of the support plate 26 facing the rotatable-side ring plate 22 side. The support plate 26 is rotatable around the mounting axis 16 within the first storage space 15. The retainer 25 having the above-described configuration guides the flexible flat cable 14, so that the flexible flat cable 14 is smoothly movable in the first storage space 15 when the stator 11 and the rotator 12 rotate relative to each other.

Figure 4:
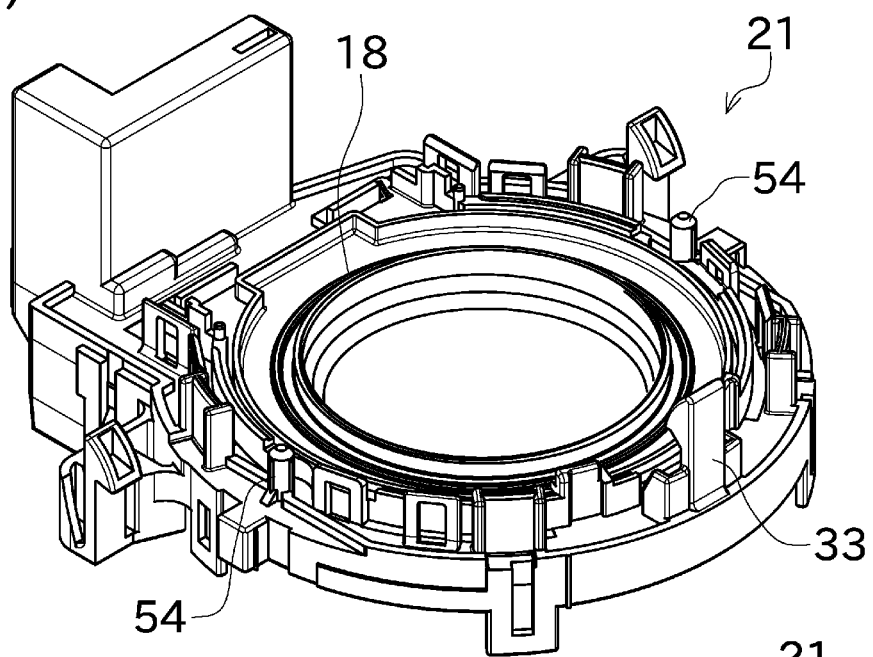
FIG. 4 (a) is a perspective view of a fixed-side ring member; and (b) is a perspective view of the fixed-side ring member as seen from another perspective.
Figure 4:
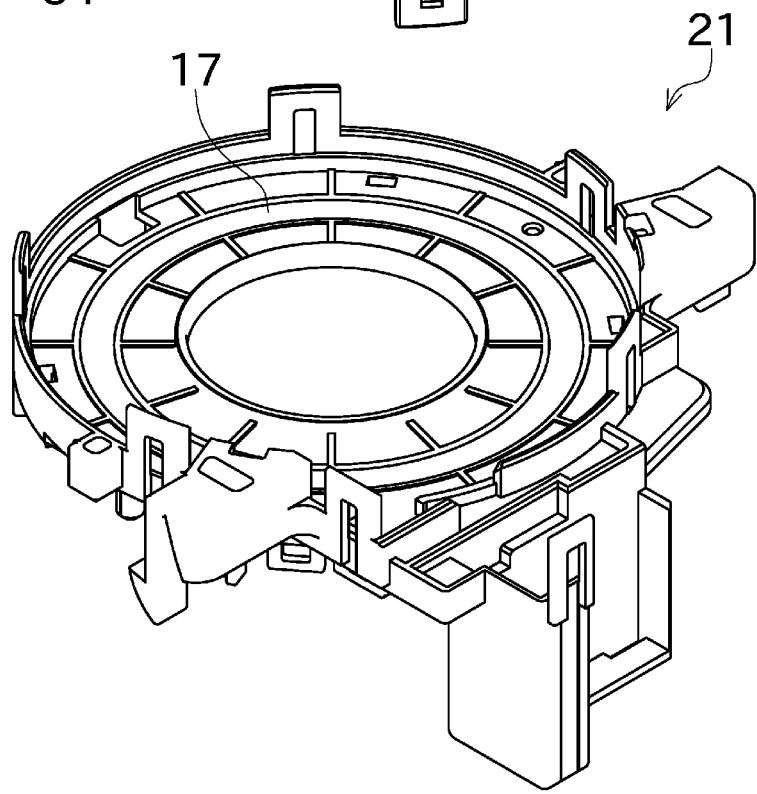

As shown in FIG. 3 and FIG. 4(b), a retainer guide face 17 is formed on a surface of the fixed-side ring plate 21 facing the first storage space 15. In the first storage space 15, the retainer 25 rotates in slidable contact with the retainer guide face 17. Guiding the retainer 25 by means of the retainer guide face 17 provides stabilized rotation of the retainer 25.

The stator 11 includes a first connector 41. The first connector 41 is connectable with a cable (not shown) that is led out of an electrical device (for example, a power source or an ECU) (not shown) provided in the vehicle body (fixed side) of the automobile. The rotator 12 includes a second connector 42. The second connector 42 is connectable with a cable (not shown) that is led out of an electrical device (for example, a horn switch or an airbag module) (not shown) provided in the steering wheel (rotatable side). The first connector 41 and the second connector 42 are electrically connected to each other by the flexible flat cable 14 stored in the first storage space 15.

The rotary connector 2 having the above-described configuration is able to electrically connect the electrical device of the rotatable side (the steering wheel) to the electrical device of the fixed side (vehicle body).

Figure 5:
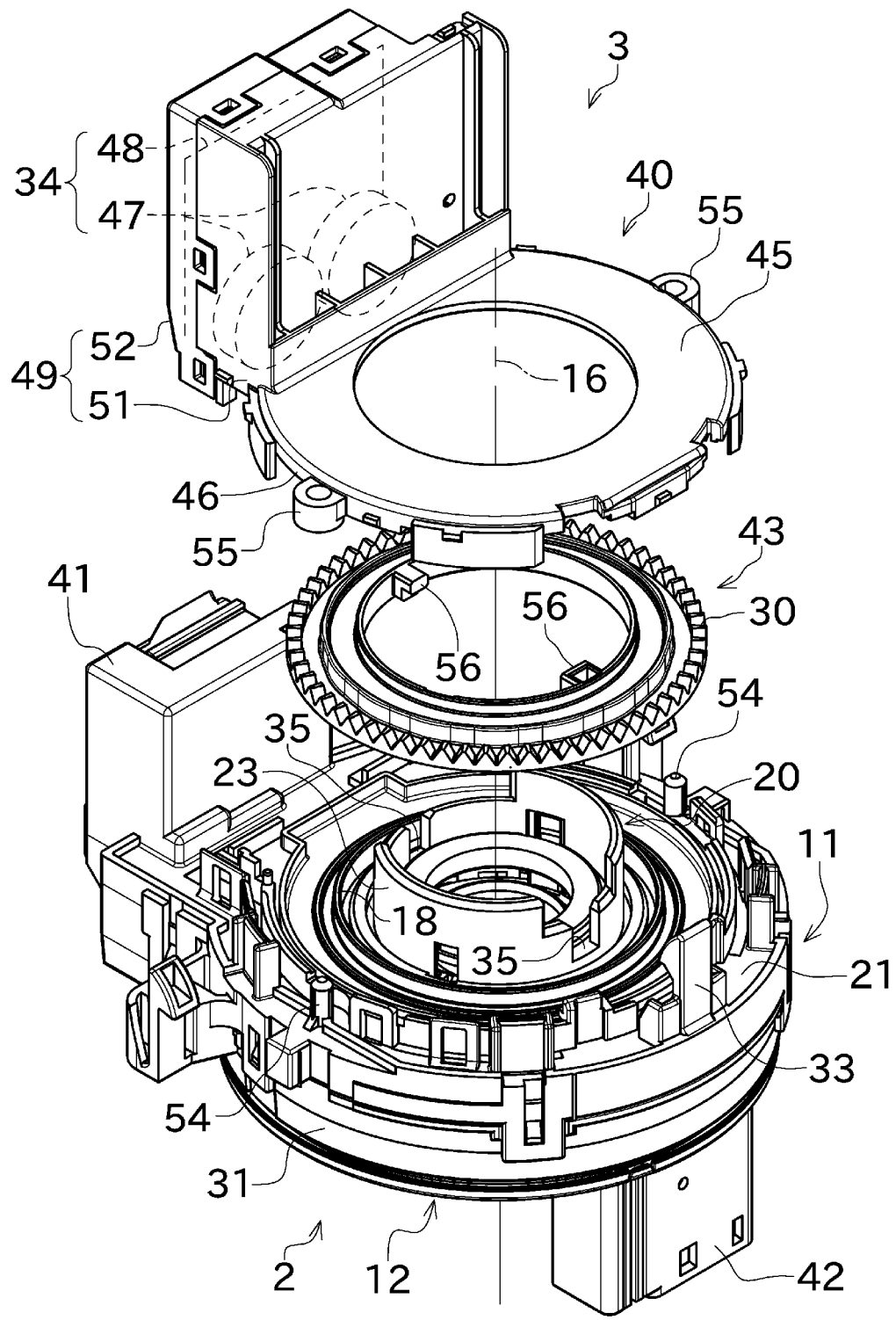
FIG. 5 A perspective view showing a situation where a steering angle sensor is assembled to the rotary connector according to the first embodiment.

Next, a sleeve 20 will be described. As shown in FIGS. 2 and 5, the sleeve 20 includes a cylindrical part 23 having a cylindrical shape that is arranged with its axis set coincident with the mounting axis 16.

The cylindrical part 23 of the sleeve 20 is partially receivable within the inner tube 32 of the rotator 12. The cylindrical part 23 has engaging elements 27. Engaging projections 59 that are engageable with the engaging elements 27 are formed on an inner wall surface of the inner tube 32 of the rotator 12. Bringing the engaging elements 27 into engagement with the engaging projections 59 (the state shown in FIG. 2) makes the sleeve 20 and the rotator 12 coupled to each other with prevention of relative rotation therebetween.

Next, the steering angle sensor 3 will be described. The steering angle sensor 3 includes a sensor housing 40, a rotatable member 43, and a detector 34.

Figure 6:
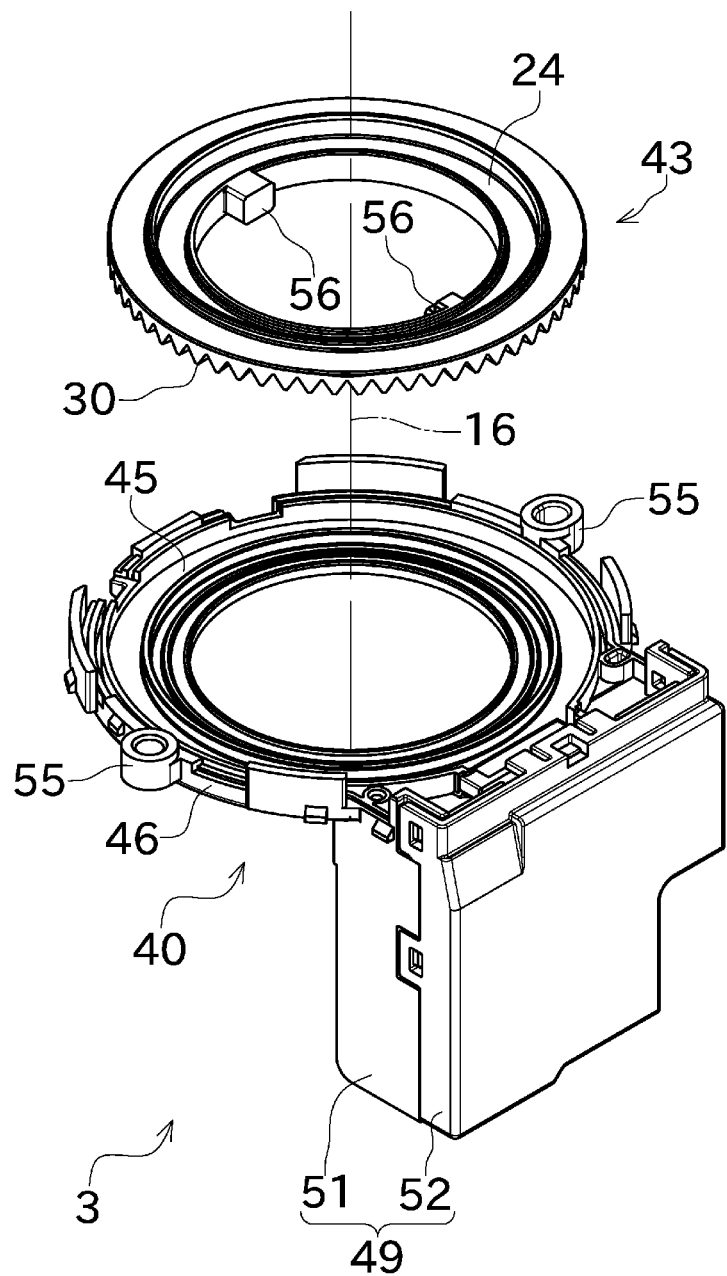
FIG. 6 A perspective view of a sensor housing and a rotatable member as seen from a perspective different from the perspective of FIG. 5.

As shown in FIGS. 2, 5, and 6, the sensor housing 40 includes a bottom ring plate 45 and a tube 46 having a cylindrical shape. The bottom ring plate 45 is arranged opposed to the fixed-side ring plate 21 of the stator 11 with respect to the direction of the mounting axis 16. An outer peripheral edge portion of the bottom ring plate 45 extends toward the fixed-side ring plate 21, to form the tube 46.

As shown in FIG. 5, the fixed-side ring plate 21 of the stator 11 includes an engaging pawl 33 that is engageable with the sensor housing 40 of the steering angle sensor 3. The engaging pawl 33 is engaged with the sensor housing 40, and thereby the sensor housing 40 is fixed to the stator 11 (the state shown in FIG. 1). In the state where the sensor housing 40 is fixed to the stator 11, a second storage space 50 having an annular shape is defined that is enclosed by the fixed-side ring plate 21, the bottom ring plate 45, and the tube 46, as shown in FIG. 2.

As shown in FIGS. 5 and 6, the rotatable member 43 is a ring-shaped member arranged with its axis set coincident with the mounting axis 16. The rotatable member 43 is formed integrally with a drive gear 30 including gear teeth that protrude in the direction parallel to the mounting axis 16. The rotatable member 43 is also formed integrally with engaging projections 56 that protrude radially inward. The engaging projections 56 are formed at the inner circumference of the rotatable member 43.

The rotatable member 43 having a ring-like shape is configured such that the cylindrical part 23 of the sleeve 20 is receivable at the inner circumferential side of the rotatable member 43. As shown in FIG. 5, the sleeve 20 has cutouts 35 that are engageable with the engaging projections 56. Each of the cutouts 35, which is formed in the direction of the mounting axis 16, has a substantially C-like shape (or a substantially U-like shape) that is opened toward one side with respect to the direction of the mounting axis 16. Thus, inserting the cylindrical part 23 of the sleeve 20 into the inner circumferential side of the rotatable member 43 in the direction of the mounting axis 16 allows the engaging projections 56 to be engaged with the cutouts 35. Bringing the engaging projections 56 into engagement with the cutouts 35 is able to couple the rotatable member 43 to the sleeve 20 such that they cannot rotate relative to each other around the mounting axis 16.

As shown in FIG. 2, the rotatable member 43 (and the drive gear 30 provided thereto) is arranged in the second storage space 50. As shown in FIG. 6, an annular groove 24 is formed in a surface of the rotatable member 43 opposite to its surface on which the gear teeth of the drive gear 30 are provided. As shown in FIG. 4(a), a rotation guide 18 is provided on a surface (at the sensor housing 40 side) of the fixed-side ring plate 21 opposite to its surface on which the retainer guide face 17 is formed. As shown in FIG. 4(a), the rotation guide 18 is in the shape of a rib having a ring-like shape centered at the mounting axis 16. As shown in FIG. 2, the rotation guide 18 is configured so as to penetrate the inside of the groove 24 formed in the rotatable member 43. This configuration allows the rotation guide 18 having a rib-like shape to function as a rail for guiding the rotation of the rotatable member 43, thereby providing stabilized rotation of the rotatable member 43 (and the drive gear 30 provided thereto).

As shown in FIG. 5, the detector 34 includes idler gears 47 and a circuit board 48. A magnet (not shown) is fixed to the idler gear 47. A detection element that detects a change in a magnetic field of the magnet caused by rotation of the idler gears 47 is arranged on the circuit board 48. The circuit board 48 is configured to output a detection signal of the detection element to the outside as appropriate. Since a steering angle sensor including such a detector is known as disclosed in, for example, the Patent Document 2, a detailed description thereof is omitted. Here, in the steering angle sensor of the Patent Document 2, the rotation axis of an idler gear is in parallel with the rotation axis of a drive gear (an annular drive gear). In contrast, in the steering angle sensor of this embodiment, the rotation axis of each idler gear 47 is substantially perpendicular to the rotation axis (the mounting axis 16) of the drive gear 30. Gear teeth of each idler gear 47 are formed so as to protrude radially outward of the idler gear 47.

The sensor housing 40 includes a holder 49 for holding the detector 34 (the idler gears 47 and the circuit board 48). The holder 49 is in the shape of a substantially rectangular tube that protrudes from the bottom ring plate 45 in the direction of the mounting axis 16. The interior of the holder 49 serves as a detector storage space. As shown in FIG. 5, the holder 49 includes a first housing 51 and a second housing 52. The first housing 51 is formed integrally with the bottom ring plate 45 of the sensor housing 40. The second housing 52 is formed as a member separate from the first housing 51. The second housing 52 is configured to be engageable with and fixed to the first housing 51. Engaging the first housing 51 and the second housing 52 with each other creates the detector storage space, and the detector 34 can be held within the detector storage space.

The sensor housing 40 has a communication part (not shown) through which the detector storage space of the holder 49 communicates with the second storage space 50. The idler gears 47 held in the holder 49 and the drive gear 30 stored in the second storage space 50 can be meshed with each other via the communication part.

In the above-described configuration, the rotator 12 rotates relative to the stator 11, so that the sleeve 20 coupled to the rotator 12 rotates. As a result, the rotatable member 43 coupled to the sleeve 20 rotates within the second storage space 50. This causes the drive gear 30 to rotate around the mounting axis 16, which rotationally drives the idler gears 47 meshed with the drive gear 30. The amount of this rotation of the idler gears 47 is detected by the detection element mounted to the circuit board 48. Such a configuration enables the detector 34 of the steering angle sensor 3 to detect the amount of rotation of the rotator 12 (the amount of operation of the steering wheel).

Next, a characteristic configuration of the rotary connector 1 with sensor assembled thereto according to this embodiment will be described.

In the rotary connector 1 with sensor assembled thereto according to this embodiment, as mentioned above, the first storage space 15 of the rotary connector 2 is defined as a space enclosed by the stator 11 (the fixed-side ring plate 21 and the inner tube 31) and the rotator 12 (the rotatable-side ring plate 22 and the outer tube 32). The second storage space 50 of the steering angle sensor 3 is defined as a space enclosed by the sensor housing 40 (the bottom ring plate 45 and the tube 46) and the stator 11 (the fixed-side ring plate 21).

Thus, the fixed-side ring plate 21 of the stator 11 of this embodiment serves both to define the first storage space 15 and to define the second storage space 50.

Moreover, as mentioned above, the retainer guide face 17 and the rotation guide 18 are provided on the fixed-side ring plate 21 of the stator 11 of this embodiment. That is, the fixed-side ring plate 21 of the stator 11 of this embodiment serves both for guiding the retainer 25 of the rotary connector 2 (as the retainer guide face) and for guiding the rotatable member 43 of the steering angle sensor 3 (as the rotation guide 18).

In this manner, the stator 11 of this embodiment is used as a member shared between the rotary connector 2 and the steering angle sensor 3. Allowing shared use of a component part between the rotary connector 2 and the steering angle sensor 3 can reduce the total number of parts of the rotary connector 1 with sensor assembled thereto, and can reduce the assembling effort. Additionally, this can reduce an accumulation of tolerances, which may otherwise be caused in a case where the rotary connector 2 and the steering angle sensor 3 are arranged so as to overlap each other with respect to the direction of the mounting axis 16. Therefore, the entire tolerance is reduced.

In the rotary connector 1 with sensor assembled thereto according to this embodiment, a plurality of positioning parts for setting the relative positions of the fixed-side ring plate 21 and the sensor housing 40 are provided to the fixed-side ring plate 21 of the stator 11 and the sensor housing 40. In this embodiment, the positioning parts include positioning pins 54 and insertion holes 55. More specifically, as shown in FIG. 5, a plurality of positioning pins 54 that protrude in the direction parallel to the mounting axis 16 are provided to the fixed-side ring plate 21. A plurality of insertion holes 55 through which the positioning pins 54 are inserted are provided in the sensor housing. The positioning pins 54 being inserted through the corresponding insertion holes 55 settles the position of the sensor housing 40 relative to the stator 11. Thus, the sensor housing 40 can be mounted to the stator 11 with good accuracy.

As mentioned above, part (the first housing 51) of the holder 49 is formed integrally with the sensor housing 40. Accordingly, settling the position of the sensor housing 40 relative to the stator 11 in the above-described manner results in position settlement of the holder 49 relative to the stator 11.

Here, in the state where the steering angle sensor 3 is not mounted to the rotary connector 2 (FIG. 6), the sensor housing 40 is opened (not closed by the fixed-side ring plate 21) at its one side (at the stator 11 side). In this state, the second storage space 50 is opened.

For example, in the steering angle sensor having the configuration of the Patent Document 2, it is impossible to keep elements of the steering angle sensor (the idler gear, the circuit board, and the like) held in the housing under the state where the housing of the steering angle sensor is not closed. Therefore, the steering angle sensor having the configuration of the Patent Document 2 cannot be handled as a single module when the housing is not closed.

In the steering angle sensor 3 of this embodiment, the sensor housing 40 includes the holder 49 for holding the detector 34, as mentioned above. The holder 49 is configured to hold the detector 34 (the idler gears 47 and the circuit board 48) even under the state where the second storage space 50 is opened (the state where the sensor housing 40 is not closed at its one side by the fixed-side ring plate 21; the state shown in FIG. 6).

Accordingly, the configuration of this embodiment enables the steering angle sensor 3 (the sensor housing 40 and the detector 34) in the state of being not mounted to the rotary connector 2 to be handled as a single module.

On the other hand, the rotary connector 2 of this embodiment is able to define the first storage space 15 enclosed by the stator 11 (the fixed-side ring plate 21 and the inner tube 31) and the rotator 12 (the rotatable-side ring plate 22 and the outer tube 32) even in the state where the steering angle sensor 3 is not mounted (the state shown in FIG. 5). Therefore, the flexible flat cable 14 and the retainer 25 can be held within the first storage space 15. Accordingly, the rotary connector 2 of this embodiment can be handled as a single module even in the state where the steering angle sensor 3 is not mounted thereto.

Thus, the configuration of this embodiment achieves shared use of part of the components of the rotary connector 2 and the steering angle sensor 3, but nevertheless enables the rotary connector 2 and the steering angle sensor 3 to be handled as independent modules. Accordingly, the rotary connector 2 and the steering angle sensor 3 can be handled with ease. This can improve assembling properties of the rotary connector 1 with sensor assembled thereto.

In the state (the state shown in FIG. 5) before the steering angle sensor 3 is assembled to the rotary connector 2, the second storage space 50 serving to store the rotatable member 43 is opened. In this embodiment, the rotatable member 43 is a member separate from the sleeve 20. In the state where the second storage space 50 is opened (the state shown in FIG. 5), the rotatable member 43 is detached from the sleeve 20. Therefore, the rotatable member 43 needs to be handled under strict management to avoid losing of it (this point is improved in a second embodiment which will be described later).

An operation for assembling the rotary connector 1 with sensor assembled thereto according to this embodiment is performed as follows. Firstly, the rotary connector 2 is assembled, and the detector 34 is assembled to the holder 49 of the sensor housing 40. Then, the sleeve 20 is attached to the rotator 12 of the rotary connector 2.

Then, the rotatable member 43 is coupled to the sleeve 20. Then, the sensor housing 40 of the steering angle sensor 3 is brought close to the stator 11 of the rotary connector 2 in the direction parallel to the mounting axis 16. Thereby, the drive gear 30 of the rotatable member 43 coupled to the sleeve 20 and the idler gears 47 held in the holder of the sensor housing 40 are brought close to each other in the direction parallel to the mounting axis 16.

As mentioned above, the gear teeth of the drive gear 30 of this embodiment protrude in the direction parallel to the mounting axis 16. As mentioned above, the idler gears 47 rotate around the axes that are substantially perpendicular to the mounting axis 16, and the gear teeth of the idler gears 47 protrude radially outward. As a result, the gear teeth of the drive gear 30 and the gear teeth of the idler gears 47 are arranged opposed to each other with respect to the direction parallel to the mounting axis 16. This makes it possible to properly mesh the drive gear 30 and the idler gears 47 with each other by bringing the drive gear 30 and the idler gears 47 close to each other in the direction parallel to the mounting axis 16.

Then, the positioning pins 54 of the stator 11 are inserted into the insertion holes 55 of the sensor housing 40, and, during this, the engaging pawl 33 of the stator 11 is engaged with the sensor housing 40. Thereby, the sensor housing 40 of the steering angle sensor 3 can be easily and accurately mounted to the stator 11.

As thus far described, the rotary connector 1 with sensor assembled thereto according to this embodiment includes the rotary connector 2, the sleeve 20, and the steering angle sensor 3. The rotary connector 2 includes the stator 11 and the rotator 12 that are rotatable relative to each other, and the flat cable 14 arranged in the first storage space 15 that is enclosed by the stator 11 and the rotator 12. The sleeve 20 is configured to be coupled to the rotator 12 and rotated integrally with the rotator 12. The steering angle sensor 3 includes the sensor housing 40 that is fixable to the stator 11, the idler gears 47 configured to be meshed with the drive gear 30 and rotated by the drive gear 30, the rotatable member 43 configured to be engaged with the sleeve 20 and rotated integrally with the sleeve 20, the detector 34 configured to detect the rotation of the rotatable member 43, and the holder 49 configured to hold the detector 34. The sensor housing 40 is opened at its stator 11 side. The second storage space 50 is formed that is enclosed by the sensor housing 40 and the stator 11, and the rotatable member 43 is stored in the second storage space 50. The holder 49 is able to hold the detector 34 even in the state where the second storage space 50 is not closed by the stator 11.

Accordingly, the stator 11 of the rotary connector 2 serves also to close the sensor housing 40 of the steering angle sensor 3. This leads to reduction in the number of parts, less assembling effort, and a reduced tolerance. Providing the holder 49 that is able to hold the detector 34 even in the state where the sensor housing 40 of the steering angle sensor 3 is not closed by the stator 11 enables the steering angle sensor 3 in such a state to be handled as an independent module. This makes assembling easy.

The rotary connector 1 with sensor assembled thereto according to this embodiment is configured as follows. The rotary connector 1 with sensor assembled thereto includes, in the first storage space 15, the retainer 25 for guiding the flexible flat cable 14. The retainer guide face 17 for guiding the rotation of the retainer 25 is provided on the surface of the stator 11 facing the rotator 12 side, and the rotation guide 18 for guiding the rotation of the rotatable member 43 is provided on the surface of the stator 11 facing the sensor housing 40 side.

The stator 11 serves both for guiding the retainer 25 and for guiding the rotatable member 43 of the steering angle sensor 3. This can reduce the number of parts, and also provides stabilized rotation of the retainer 25 and the rotatable member 43.

The rotary connector 1 with sensor assembled thereto according to this embodiment is configured as follows. The stator 11 and the sensor housing 40 include a plurality of positioning parts for settling the position of the sensor housing 40 relative to the stator 11. The positioning parts include the positioning pins 54 and the insertion holes 55. The positioning pins 54, which are provided to the stator 11, protrude in the direction parallel to the mounting axis 16. The insertion holes 55, which are provided in the sensor housing 40, receive the positioning pins 54 inserted therethrough.

Since the position of the sensor housing 40 of the steering angle sensor 3 is directly settled relative to the stator 11 of the rotary connector 2, the steering angle sensor 3 can be assembled to the rotary connector 2 with improved accuracy. Since the positioning part includes the positioning pins 54 that protrude in the direction parallel to the mounting axis, the position settlement is achieved easily by assembling of the steering angle sensor 3 to the stator 11 in the mounting axis direction.

The rotary connector 1 with sensor assembled thereto according to this embodiment is configured as follows. The gear teeth of the drive gear 30 are formed so as to protrude in the direction parallel to the mounting axis 16 of the rotary connector 2 and the steering angle sensor 3. The idler gears 47 are supported on the holder 49 such that the axes around which the idler gears 47 rotate are substantially perpendicular to the mounting axis 16.

Such arrangement in which the gear teeth of the drive gear 30 are opposed to the gear teeth of the idler gears 47 with respect to the direction parallel to the mounting axis 16 is able to cause the drive gear 30 and the idler gears 47 to be meshed with each other by bringing these gears close to each other in the direction of the mounting axis 16. This improves the workability in assembling.

Next, a second embodiment of the invention of the present application will be described. In the following description of the second embodiment, elements of the configuration identical or similar to those of the first embodiment may not be described and instead the same reference signs as in the first embodiment will be given to the element names or given on the drawings.

In the rotary connector 1 with sensor assembled thereto according to the first embodiment, as mentioned above, the rotatable member 43 is detached from the sleeve 20 in the state where the second storage space 50 is opened (the state shown in FIG. 5). Therefore, the rotatable member 43 needs to be handled under strict management to avoid losing of it. Additionally, in the rotary connector 1 with sensor assembled thereto according to the first embodiment, it is necessary that the cutouts 35 and the engaging projections 56 are engageable, which requires a certain large tolerance to be ensured in a portion where the cutouts 35 and the engaging projections 56 are engaged with each other. In other words, there is a tolerance between the sleeve 20 and the drive gear 30 in the first embodiment. Therefore, the configuration of the first embodiment has a limitation in terms of improvement of the accuracy of detection of the steering angle sensor 3.

Figure 7:
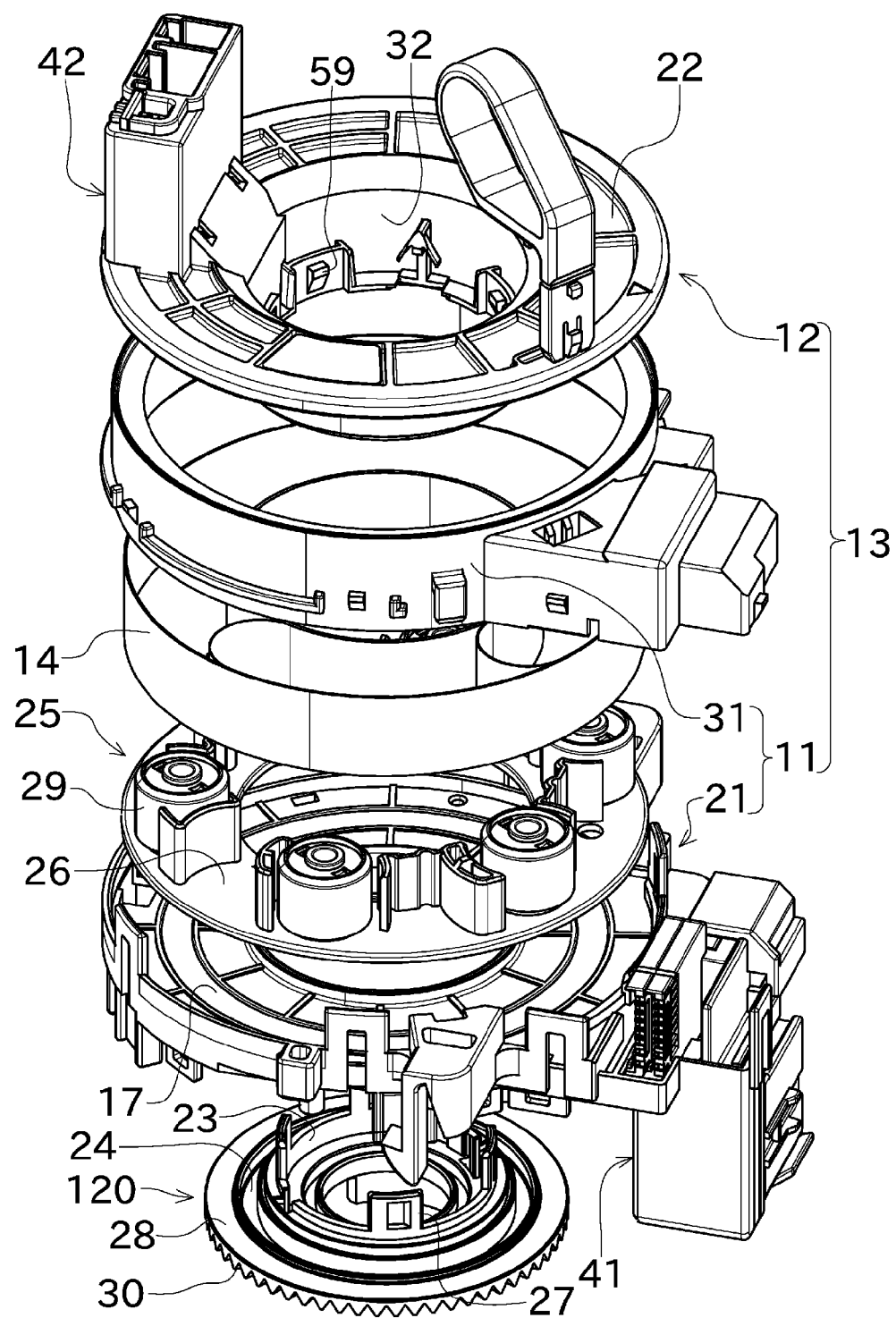
FIG. 7 An exploded perspective view of a rotary connector according to a second embodiment.
Figure 8:
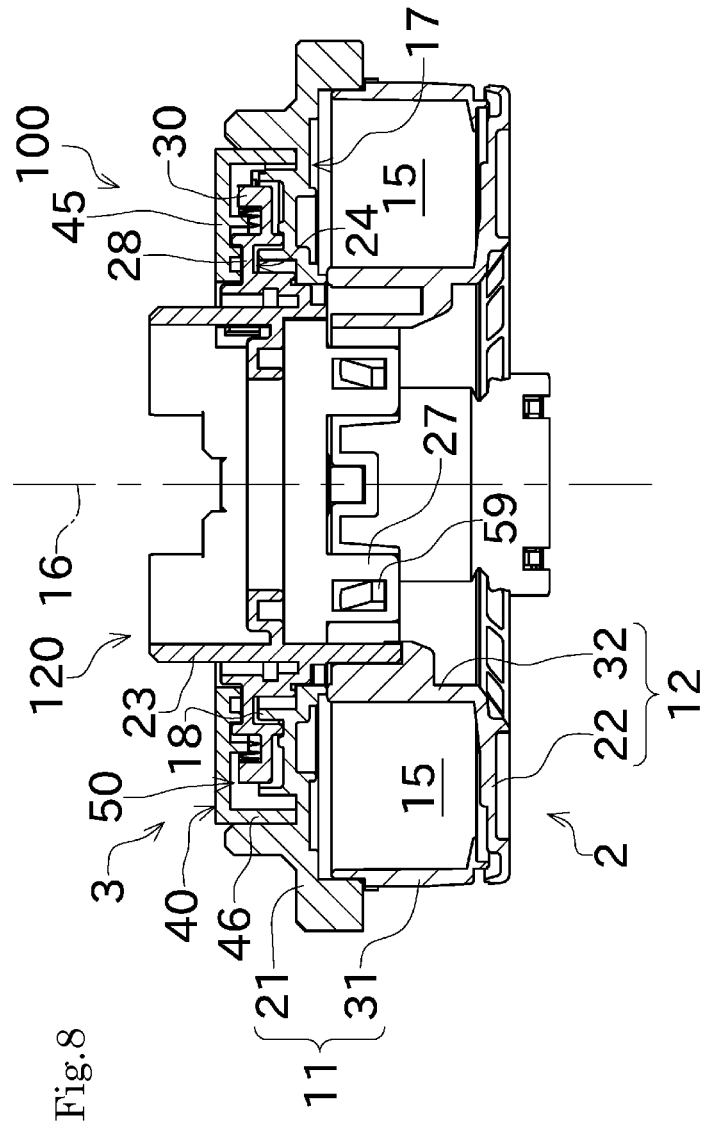
FIG. 8 A cross-sectional view of the rotary connector with sensor assembled thereto according to the second embodiment.
Figure 9:
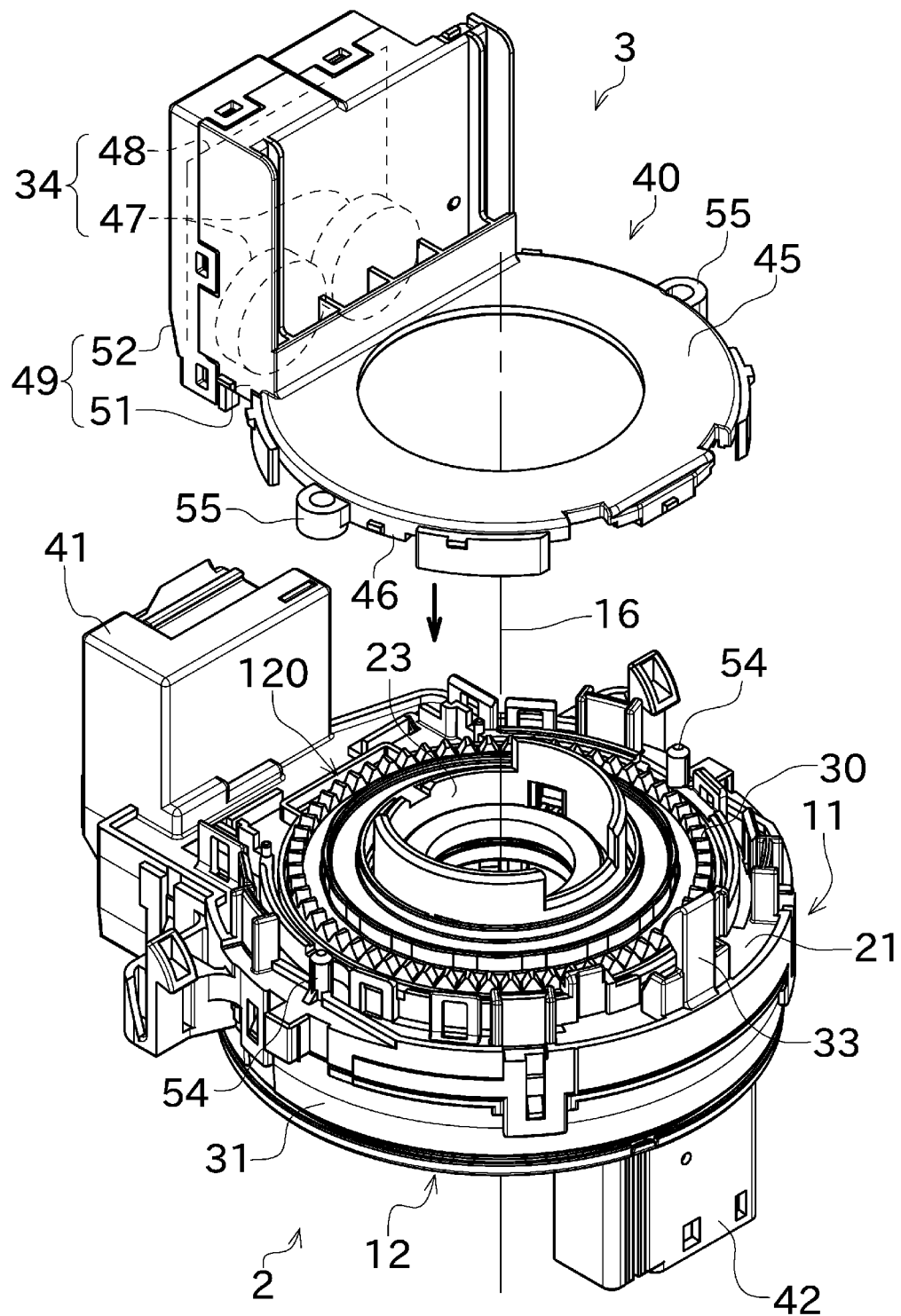
FIG. 9 A perspective view showing a situation where a steering angle sensor is assembled to the rotary connector according to the second embodiment.
Figure 10:
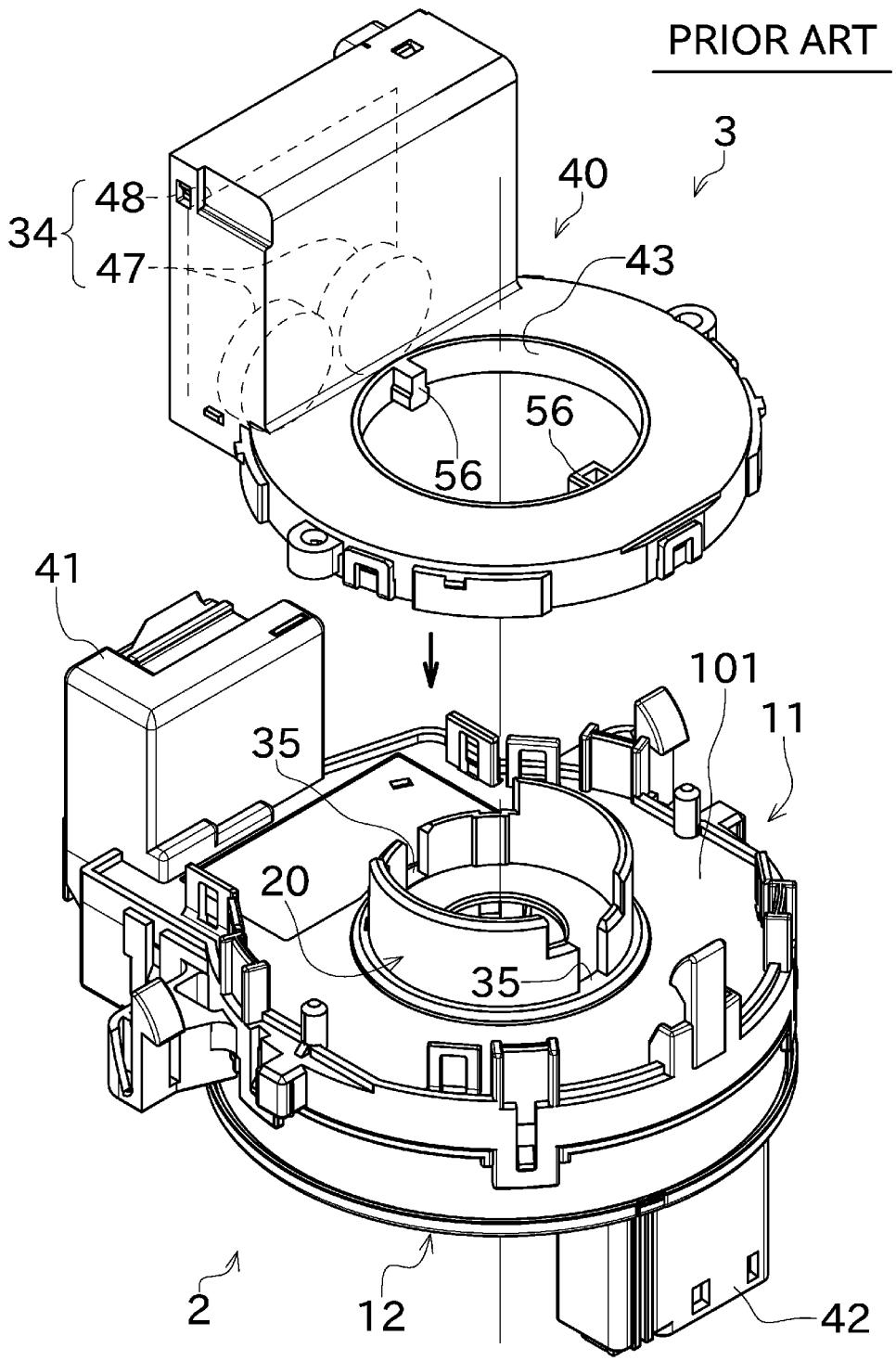
FIG. 10 A perspective view showing a situation where a conventional steering angle sensor is assembled to a conventional rotary connector.
Figure 11:
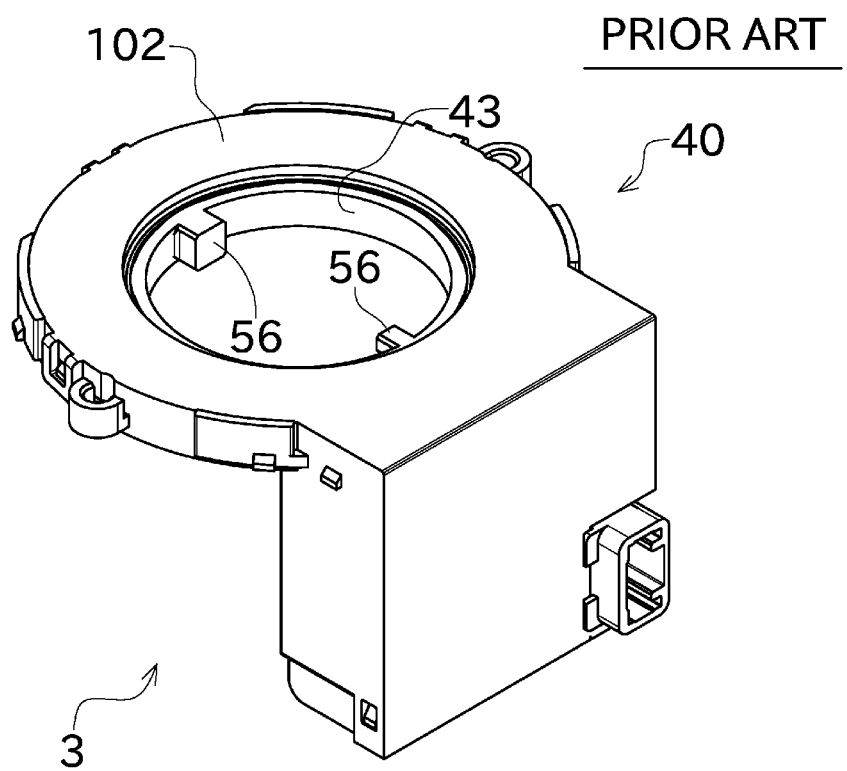
FIG. 11 A perspective view showing the conventional steering angle sensor as seen from a perspective different from the perspective of FIG. 10.

The rotary connector 100 with sensor assembled thereto according to the second embodiment which will be described below solves the problems of the first embodiment mentioned above. FIGS. 7 to 9 show a configuration of the rotary connector 100 with sensor assembled thereto according to the second embodiment.

The rotary connector 100 with sensor assembled thereto according to the second embodiment is an integrated assembly of the rotary connector 2 and the steering angle sensor 3, which is similar to the first embodiment.

Similarly to the first embodiment, the rotary connector 100 with sensor assembled thereto according to the second embodiment includes the holder 49. The holder 49 is configured to hold the detector 34 (the idler gears 47 and the circuit board 48) even in the state where the second storage space 50 is opened (the state where the sensor housing 40 is not closed at its one side by the fixed-side ring plate 21; the state shown in FIG. 9). Accordingly, the configuration of the second embodiment also enables the steering angle sensor 3 (the sensor housing 40 and the detector 34) in the state of being not mounted to the rotary connector 2 to be handled as a single module The rotary connector 100 with sensor assembled thereto according to the second embodiment includes a sleeve 120. The sleeve 120 of the second embodiment is an integration of the sleeve 20 and the rotatable member 43 of the first embodiment.

More specifically, the sleeve 120 of the second embodiment includes the cylindrical part 23 as shown in FIG. 7. The cylindrical part 23 has, on its outer periphery, a flange 28 having a flange-like shape that protrudes radially outward. The flange 28 is integrated with the cylindrical part 23. The flange 28 is formed integrally with the drive gear 30 including gear teeth that protrude in the direction parallel to the mounting axis 16.

The second embodiment, in which the drive gear 30 is integrated with the sleeve 120, has no tolerance between the sleeve 120 and the drive gear 30. This can improve the accuracy of the steering angle sensor 3.

In the second embodiment, as shown in FIG. 7, the groove 24 having an annular shape is formed in a surface of the flange 28 of the sleeve 120 opposite to its surface on which the gear teeth of the drive gear 30 are provided. On the other hand, similarly to the first embodiment, the rotation guide 18 in the shape of a ring-like rib is formed on the surface (at the sensor housing 40 side) of the fixed-side ring plate 21 opposite to its surface on which the retainer guide face 17 is formed. As shown in FIG. 8, the rotation guide 18 is configured so as to penetrate the inside of the groove 24 formed in the flange 28 of the sleeve 120. This configuration allows the rotation guide 18 having a rib-like shape to function as a rail for guiding the rotation of the drive gear 30, thereby providing stabilized rotation of the drive gear 30.

In the second embodiment, as well as the first embodiment, a space enclosed by the sensor housing 40 (the bottom ring plate 45 and the tube 46) and the stator 11 (fixed-side ring plate 21) serves as the second storage space 50. In the second embodiment, the flange 28 of the sleeve 120 (and the drive gear 30 provided thereto) is arranged in the second storage space 50. The drive gear 30 is arranged so as to be meshed with the idler gears 47 held in the holder 49. Such a configuration is able to detect the amount of rotation of the rotator 12 (the amount of operation of the steering wheel), similarly to the steering angle sensor 3 of the first embodiment.

In the second embodiment, as well as the first embodiment, the cylindrical part 23 of the sleeve 120 is configured to be coupled to the rotator 12 of the rotary connector 2. This allows the sleeve 120 to be fixed to the rotary connector 2, thus enabling the rotary connector 2 having the sleeve 120 fixed thereto to be handled as a single module.

In the second embodiment, the sleeve 120 is formed integrally with the drive gear 30. Therefore, the rotary connector 100 with sensor assembled thereto according to the second embodiment is able to avoid detaching of the drive gear 30 from the sleeve 120 even in the state (the state where the second storage space 50 is opened) before the steering angle sensor 3 is assembled to the rotary connector 2. This can further improve assembling properties of the rotary connector 100 with sensor assembled thereto.

As thus far described, the rotary connector 100 with sensor assembled thereto according to the second embodiment includes the rotary connector 2, the sleeve 120, and the steering angle sensor 3. The rotary connector 2 includes the stator 11 and the rotator 12 that are rotatable relative to each other, and the flat cable 14 arranged in the first storage space 15 that is enclosed by the stator 11 and the rotator 12. The sleeve 120 includes the cylindrical part 23 configured to be coupled to the rotator 12 and rotated integrally with the rotator 12. The cylindrical part 23 is formed integrally with the drive gear 30 that is provided at the periphery of the cylindrical part 23. The steering angle sensor 3 includes the sensor housing 40 that is fixable to the stator 11, the idler gears 47 configured to be meshed with the drive gear 30 and rotated by the drive gear 30, the circuit board 48 on which the detection element for detecting the rotation of the idler gears 47 is mounted, and the holder 49 configured to hold the circuit board 48 and the idler gears 47. The sensor housing 40 is opened at its stator 11 side. The second storage space 50 is formed that is enclosed by the sensor housing 40 and the stator 11, and the drive gear 30 is stored in the second storage space 50. The holder 49 is able to hold the idler gears 47 and the circuit board 48 even in the state where the second storage space 50 is not closed by the stator 11.

Forming the sleeve 120 integrally with the drive gear 30 leads to further reduction in the number of parts. Additionally, since the drive gear 30 is integrated with the sleeve 120, the drive gear 30 can be kept held on the steering angle sensor 3 side by the sleeve 120 being coupled to the rotator 12. Moreover, since the drive gear 30 is integrated with the sleeve 120, a smaller tolerance is required as compared with a case where they are configured as separate members (first embodiment). As a result, the accuracy of detection of the steering angle sensor 3 can be improved.

The rotary connector 100 with sensor assembled thereto according to the second embodiment is configured as follows. The rotary connector 100 with sensor assembled thereto includes, in the first storage space 15, the retainer 25 for guiding the flexible flat cable 14. The retainer guide face 17 for guiding the rotation of the retainer 25 is provided on the surface of the stator 11 facing the rotator 12 side, and the rotation guide 18 for guiding the rotation of the drive gear 30 is provided on the surface of the stator 11 facing the sensor housing 40 side.

The stator 11 serves both for guiding the retainer 25 and for guiding the drive gear 30. This can reduce the number of parts, and also provides stabilized rotation of the retainer 25 and the drive gear 30.

Although some preferred embodiments of the present invention have been described above, the above-described configurations can be modified, for example, as follows.

Applications of the rotary connector with sensor assembled thereto of the present invention are not limited to a steering of an automobile, but wise use is allowed for the purpose of electrical connection between a rotatable side and a fixed side.

Although the above-described embodiments illustrate a case where the detector 34 detects a change in the magnetic field of the magnet, this is not limiting. Any appropriate configuration is adoptable, including a configuration in which, for example, the rotation of the idler gears 47 is detected.

DESCRIPTION OF THE REFERENCE NUMERALS 1 rotary connector with sensor assembled thereto
2 rotary connector
3 steering angle sensor
11 stator
12 rotator
14 flexible flat cable
20 sleeve
34 detector
40 sensor housing
43 rotatable member
49 holder

The invention claimed is:

1. A rotary connector with sensor assembled thereto, comprising a rotary connector, a sleeve, and a steering angle sensor,
the rotary connector comprising:
a stator and a rotator that are rotatable relative to each other; and
a flat cable arranged in a first storage space that is enclosed by the stator and the rotator,
the sleeve being configured to be coupled to the rotator and rotated integrally with the rotator,
the steering angle sensor comprising:
a sensor housing that is fixable to the stator;
a rotatable member configured to be engaged with the sleeve and rotated integrally with the sleeve;
a detector configured to detect rotation of the rotatable member; and
a holder configured to hold the detector,
the sensor housing being opened at the stator side thereof,
a second storage space being formed that is enclosed by the sensor housing and the stator, the rotatable member being stored in the second storage space,
the holder being configured to hold the detector even in a state where the second storage space is opened, and
a rotation guide for guiding rotation of the rotatable member is provided on a surface of the stator facing the sensor housing side.

2. The rotary connector with sensor assembled thereto according to claim 1, wherein
the stator and the sensor housing include a plurality of positioning parts for settling a position of the sensor housing relative to the stator, and wherein
a positioning part from the plurality of positioning parts includes:
a positioning pin provided to either one of the stator and the sensor housing, the positioning pin protruding in a direction parallel to a mounting axis of the rotary connector and the steering angle sensor.

3. The rotary connector with sensor assembled thereto according to claim 2, wherein
the positioning part includes:
an insertion hole provided in the sensor housing, the insertion hole being configured to receive the positioning pin inserted therethrough.

4. A rotary connector with sensor assembled thereto, comprising a rotary connector, a sleeve, and a steering angle sensor,
the rotary connector comprising:
a stator and a rotator that are rotatable relative to each other; and
a flat cable arranged in a first storage space that is enclosed by the stator and the rotator,
the sleeve including a cylindrical part configured to be coupled to the rotator and rotated integrally with the rotator, the cylindrical part being formed integrally with a drive gear that is provided at the periphery of the cylindrical part,
the steering angle sensor comprising:
a sensor housing that is fixable to the stator;
an idler gear configured to be meshed with the drive gear and rotated by the drive gear;
a circuit board on which a detection element for detecting rotation of the idler gear is mounted; and
a holder configured to hold the idler gear and the circuit board,
the sensor housing being opened at the stator side thereof,
a second storage space being formed that is enclosed by the sensor housing and the stator, the drive gear being stored in the second storage space,
the holder being configured to hold the idler gear and the circuit board even in a state where the second storage space is opened, and
a rotation guide for guiding rotation of the drive gear is provided on a surface of the stator facing the sensor housing side.

5. The rotary connector with sensor assembled thereto according to claim 4, wherein
gear teeth of the drive gear are formed so as to protrude in a direction parallel to a mounting axis of the rotary connector and the steering angle sensor,
the idler gear is supported on the holder such that an axis around which the idler gear rotates is substantially perpendicular to the mounting axis.

6. The rotary connector with sensor assembled thereto according to claim 4, wherein
gear teeth of the drive gear are formed so as to protrude in a direction parallel to a mounting axis of the rotary connector and the steering angle sensor,
the idler gear is supported on the holder such that an axis around which the idler gear rotates is substantially perpendicular to the mounting axis.

7. The rotary connector with sensor assembled thereto according to claim 4, wherein
the stator and the sensor housing include a plurality of positioning parts for settling a position of the sensor housing relative to the stator,
a positioning part from the plurality of positioning parts includes:
a positioning pin provided to either one of the stator and the sensor housing, the positioning pin protruding in a direction parallel to a mounting axis of the rotary connector and the steering angle sensor; and
an insertion hole provided in the sensor housing, the insertion hole being configured to receive the positioning pin inserted therethrough.

8. The rotary connector with sensor assembled thereto according to claim 4, wherein
the stator and the sensor housing include a plurality of positioning parts for settling a position of the sensor housing relative to the stator,
the plurality of positioning parts includes:
a positioning pin provided to either one of the stator and the sensor housing, the positioning pin protruding in a direction parallel to a mounting axis of the rotary connector and the steering angle sensor; and
an insertion hole provided in the sensor housing, the insertion hole being configured to receive the positioning pin inserted therethrough.

* * * * *